United States Patent Office
3,422,107
Patented Jan. 14, 1969

3,422,107
CERTAIN OXOALKYLDIMETHYLXANTHINES AND A PROCESS FOR THE PREPARATION THEREOF
Werner Mohler, Wiesbaden-Biebrich, and Mario Reiser, Kurt Popendiker, and Heinz-Georg von Schuh, Wiesbaden, Germany, assignors to Chemische Werke Albert, Wiesbaden-Biebrich, Germany, a corporation of Germany
No Drawing. Filed Aug. 30, 1965, Ser. No. 483,803
Claims priority, application Germany, Sept. 5, 1964, C 33,811, C 33,812; July 2, 1965, C 36,289; July 10, 1965, C 36,362; July 24, 1965, C 36,493
U.S. Cl. 260—256                                          3 Claims
Int. Cl. C07d 57/40; A61k 25/00

It is already known to produce the 7-acetonyl-1,3- or the 1-acetonyl-3,7-dimethylxanthine respectively by reacting 1,3- or 3,7-dimethylxanthine respectively with haloacetone in the presence of alkali hydroxide. Also the 7-(3'-oxobutyl)-1,3-dimethylxanthine, which has been obtained from 1,3-dimethylxanthine and methyl-β-diethylaminoethylketone, is already known. In these known compounds the carbonyl group is bound via one or two carbon atoms respectively with the xanthine-skeleton.

The present invention is now directed to a process for the manufacture of 1-[(ω-1)-oxoalkyl]-3,7- or 7-[(ω-1)-oxoalkyl]-1,3-dimethylxanthines respectively of the formulae

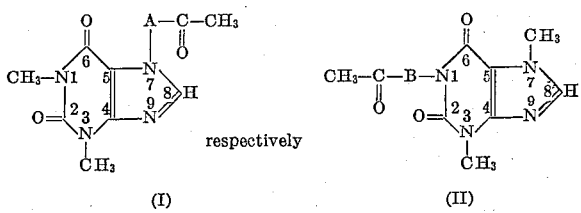

(I)                  respectively                 (II)

in which A means an alkylene group having 3 to 6, preferably 3 to 5 carbon atoms and B an alkylene group having 2 to 5, preferably 2 to 4 carbon atoms and the ketogroup has a distance of 2 to 5, preferably 3 to 4 carbon atoms from the xanthine skeleton. The groups A and B are generally straight-chained, but may, if desired, contain a side chain, above all on the carbon atom adjacent to the carbonyl group. Thus 2-alkyl-3-oxobutyl compounds are suitable substances.

The compounds according to the invention are distinguished by a marked vaso-dilatory effect with a low toxicity. They have the surprising property of being readily soluble in lipids and in water. Hitherto no theophylline- or theobromine-derivatives being readily soluble in water and simultaneously easily dissolved in lipids, have been known. Owing to these favourable solubility characteristics, the compounds according to the invention are widely applicable for therapeutic purposes.

The compounds according to the invention may be prepared by any convenient method. According to a further feature of the invention, we provide the following process for the preparation of a compound of the Formula I or II:

(1) Reaction of theophylline or theobromine at elevated temperature and in an alkaline medium with an α,β-unsaturated methyl ketone of the formula $$H_2C=CR-CO-CH_3$$

in which R represents an unbranched alkyl radical having from 1 to 4 carbon atoms in a reaction with theophylline, a hydrogen atom or an unbranched alkyl radical having from 1 to 3 carbon atoms in a reaction with theobromine, R in both cases preferably being methyl or ethyl;

(2) Reaction of α,β-dialkylaminoethyl-methyl-ketone, the alkyl groups of which each have 1 or 2 carbon atoms, with theobromine in an aqueous-organic solution (this reaction is useful only for the preparation of theobromine derivatives according to the invention);

(3) Reaction of an (ω-1)-oxoalkyl halide of the formula $CH_3-CO-A-Hal$ (in a reaction with theophylline) or $CH_3-CO-B-Hal$ (in a reaction with theobromine) in which Formulae A and B are as hereinbefore defined and Hal represents a halogen atom, preferably bromine or chlorine, with an alkali metal salt of theophylline or theobromine respectively, preferably in an aqueous-organic solution;

(4) Reaction of an 1-(ω-haloalkyl)-3,7-dimethylxanthine or 7-(ω-haloalkyl)-1,3-dimethylxanthine of the formulae

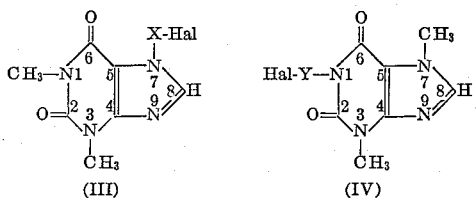

(III)                              (IV)

respectively, in which X represents an alkylene group, preferably unbranched, having 2 to 5 carbon atoms, Y represents an alkylene group, preferably unbranched, having 2 to 4 carbon atoms, and Hal is as hereinbefore defined, with an alkali metal salt, preferably the sodium salt, of ethyl acetoacetate, the reaction product being subjected to ketonic hydrolysis. The last method forms, therefore, products in which at least 3 carbon atoms are present between the keto-group and the nitrogen atom.

The said reactions are carried out in any convenient manner, generally at a temperature of 50 to 150° C., preferably 60–120° C., and if desired at elevated or reduced pressure, but usually at atmospheric pressure. The various components may be used in stoichiometrical proportions, but economic reasons may make the use of non-stoichiometrical proportions desirable. In process (3) preformed alkali metal salts may be used, but they are preferably produced in the reaction mixture. In process (1) it is advantageous to use a strong alkali in an aqueous-organic solution. The ketonic hydrolysis of process (4) is carried out in the usual manner.

Preferred solvents are water-miscible, e.g. methanol, ethanol, propanol, isopropanol or the various butanols, acetone, pyridine, polyhydric alcohols (e.g. ethylene glycol), and ethylene glycol monomethyl ether or ethylene glycol monoethyl ether.

The (ω-1)-oxohexylhalide necessary for the preparation of the oxohexyl compounds by process (3) has been obtained by condensing a 1,3-dihalopropane, especially 1,3-dibromopropane, with one mol of ethyl acetoacetate and two mols of metallic sodium in the presence of absolute alcohol. The resulting 2-methyl-3-carbethoxy-dihydropyrane of the formula

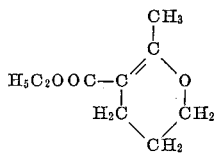

is then split by hydrogen halide, generally hydrogen bromide, to yield 1-bromohexanone-5, which in turn is reacted with an alkali metal salt of theobromine or theophylline in the said manner heerinbefore described.

However, it has now been found that 1-(5'-oxohexyl)-3,7-dimethylxanthine and 7-(5'-oxohexyl)-1,3-dimethylxanthine may be obtained in a much simpler manner as follows: firstly a 1,3-dihalopropane is condensed with 1 mol of ethyl acetoacetate in the presence of at least 2 mols of potassium carbonate, preferably anhydrous, instead of metallic sodium, in at least 90% alcohol, preferably 96%, at 60 to 110° C., preferably under reflux. Suitable dihalopropanes are those in which the halogen has an atomic weight of at least 35, e.g. 1-bromo-3-chloropropane and preferably 1,3-dibromopropane. An excess of potassium carbonate or dihalopropane may be used but generally has no particular advantage. The 2-methyl-3-carbethoxy-5,6-dihydropyrane obtained is then purified in a conventional manner, preferably by distillation, and converted in conventional manner with at least 2 mols of hydrogen halide, preferably hydrogen bromide, and, for example, under reflux, into the 1-halohexanone-5. This reaction may, however, also be carried out at a lower temperature, e.g. from 0–30° C., if instead of the conventional aqueous solution of hydrogen bromide (about 50%) a more concentrated, e.g. at least 60%, solution is used. The halohexanone is then reacted with an alkali metal salt of theobromine or theophylline respectively in the manner hereinbefore described to yield 1-(5'-oxohexyl)-3,7-dimethylxanthine or 7-(5'-oxohexyl)-1,3-dimethylxanthine.

It is an advantage of the process hereinbefore described for the preparation of a 1-halohexanone-5 that working with metallic sodium is avoided. Moreover, ordinary alcohol may be used instead of anhydrous alcohol which has to be specially prepared. In addition the reaction may be carried out with a substantially smaller amount of alcohol than the usual condensation. Moreover, the isolation of 2-methyl-3-carbethoxy-5,6-dihydropyrane may be facilitated since the inorganic salts present in the reaction mixture have a salting-out effect upon the desired reaction product. Finally the recovered alcohol may be used again for this present reaction without further purification or dehydration.

The substances of the invention may be applied per se or together with a carrier, an excipient or a solvent and administered in any desired manner. Thus, they may be dissolved or applied intravenously in water or pharmaceutically compatible aqueous solutions, such as diluted sodium chloride solution. They may also be applied orally either in solution or in solid form. In the preparation of tablets, for example, conventional tabletting procedures may be employed and the active ingredients may be associated with one or more tabletting excipients, such as starch, lactose, mannitol, hardened gelatine and talc. In the preparation of capsules the active ingredient may be filled into the capsule cases either with or without a diluent.

For the better understanding of the invention, the following examples are given by way of illustration only:

EXAMPLE 1

(A) A mixture of 560 g. of potassium carbonate, 700 ml. of ethanol (96%), 404 g. of 1,3-dibromopropane and 260 g. of ethyl acetoacetate was heated with stirring to 60° C. After the reaction had subsided, the reaction mixture was refluxed for 5 hours. Then the bulk of the alcohol was distilled off under ordinary pressure and the residue was mixed with 1.5 litres of water. The resulting oily layer was separated, and the aqueous phase was extracted with benzene and the benzene layer was combined with the oil. After drying with sodium sulfate the benzene was distilled off and the residue was fractionally distilled. 250 g. (73% of theory) of 2-methyl-3-carbethoxy-5,6-dihydropyrane of boiling point$_{14}$ 105–108° C. were obtained.

140 ml. of 63% hydrobromic acid were slowly added at room temperature to 128 g. of 2-methyl-3-carbethoxy-5,6-dihydropyrane, and much carbon dioxide was evolved. After standing for 1 to 2 days at room temperature the mixture was diluted with an equal volume of iced water; the layer of dark coloured oil formed was separated, the aqueous phase was extracted with chloroform, and the extract was combined with the oil and washed with a saturated solution of sodium bicarbonate. The solution was dried with sodium sulfate, the chloroform was distilled off under normal pressure, and the residue was fractionally distilled in vacuo. 109 g. (81% of theory) of 1-bromohexanone-5 of boiling point$_{12}$ 94–98° C. were obtained.

A solution of 10.0 g. of 1-bromohexanone-5 in 100 ml. of ethanol was gradually mixed at the boil with vigorous stirring with 11.3 g. of the sodium salt of theophylline in 100 ml. of water. After 3 hours refluxing the alcohol was distilled off, and the residual aqueous phase was cooled and made alkaline and extracted with chloroform. The chloroform solution was evaporated and the residue recrystallized from a little isopropanol to yield 7-(5'-oxohexyl)-1,3-dimethylxanthine of melting point 75–76° C. in a yield of about 80% (calculated on the reacted theophylline).

(B) 26.0 g. of 1-bromopentanone-4, dissolved in 100 ml. of ethanol, and 31.0 g. of theophylline-sodium in 175 ml. of water, were reacted according to the same method, and the product was chromatographed upon silica gel and eluted with a mixture of chloroform and ethanol (9:1 by volume). The main fraction was recrystallized from cyclohexane/ethyl acetate (4:1 by volume) to yield 7-(4'-oxopentyl)-1,3-dimethylxanthine of melting point 86–88° C.

EXAMPLE 2

A solution of 1.4 g. of sodium in 75 ml. of absolute ethanol was refluxed for 4 hours with 7.8 g. of ethyl acetoacetate and 18.0 g. of 7-(3'-bromopropyl)-1,3-dimethylxanthine. After separating the sodium bromide and subsequent evaporation of the alcohol the remaining residue was vigorously stirred with 72 ml. of 5% sodium hydroxide for 2 hours at room temperature. The aqueous phase was separated, acidified with 7.2 ml. of semiconcentrated sulfuric acid and refluxed. After decarboxylation was complete, the solution was made alkaline and extracted with chloroform. The chloroform solution was evaporated and the residue was chromatographed upon silica gel and eluted with a mixture of chloroform and ethanol (9:1 by volume). The main fraction was recrystallized from isopropanol to yield 7-(5'-oxohexyl)-1,3-dimethylxanthine of melting point 75–76° C. in about 60% yield.

EXAMPLE 3

1.2 g. of sodium, dissolved in 90 ml. of absolute ethanol, 6.7 g. of ethyl acetoacetate, and 16.0 g. of 7-(4'-bromobutyl)-1,3-dimethylxanthine were reacted according to the method of Example 2, the similar isolation procedure requiring 64 ml. of 5% sodium hydroxide and 6.4 ml. of semi-concentrated sulfuric acid. The residue from evaporation of the chloroform solution was chromatographed upon silica gel and eluted with a mixture of chloroform and ethanol (9:1 by volume). The main fraction was recrystallized from isopropanol to yield 7-(6'-oxoheptyl)-1,3-dimethylxanthine of melting point 69° C. in about 60% yield.

EXAMPLE 4

The procedure of Example 2 was repeated by reaction of 0.28 g. of sodium, dissolved in 30 ml. of absolute ethanol, 1.6 g. of ethyl acetoacetate and 3.9 g. of 7-(5'-bromopentyl)-1,3-dimethylxanthine; 16 ml. of 5% sodium hydroxide and 1.6 ml. of semi-concentrated sulfuric acid were used in the isolation. 7-(7'-oxo-octyl)-1,3-dimethylxanthine was obtained in about 60% yield upon evaporation of the chloroform solution and after recrystallisation from isopropanol melted at 85° C.

EXAMPLE 5

(A) A solution of 25.0 g. of 2-ethylbutenone-3 in 50 ml. of absolute ethanol was gradually mixed at the boil with stirring with a solution of 25.0 g. of theophylline and 13 ml. of normal sodium hydroxide in 150 ml. of a mixture of ethanol and water (1:1 by volume). After 3 hour reflux the alcohol was distilled off, and the residual aqueous phase was made alkaline and extracted with chloroform. The residue from evaporation of the chloroform solution was recrystallized from isopropanol to yield 7-(2'-ethyl-3'-oxobutyl)-1,3-dimethylxanthine of melting point 107–108° C. in about 60% yield.

(B) 33.0 g. of 2-methylbutenone-3, dissolved in 50 ml. of ethanol and a solution of 38.5 g. of theophylline and 20 ml. of normal sodium hydroxide in 200 ml. of a mixture of ethanol and water (1:1 by volume) were reacted according to the same method, and the product was isolated in the same manner to yield 7-(2'-methyl-3'-oxobutyl)-1,3-dimethylxanthine of melting point 133–135° C.

EXAMPLE 6

1.8 g. of theobromine, 0.8 g. of methylvinyl ketone and 15 ml. of dry pyridine were refluxed for 3 hours. The solvent was removed in vacuo and the residue was recrystillized from isopropanol. 1-(3'-oxobutyl)-3,7-dimethylxanthine of melting point 144–146° C. was obtained in a yield of about 70%.

EXAMPLE 7

1.8 g. of theobromine, 5.0 g. of 2-methylbutenone-3, 1.0 ml. of normal sodium hydroxide and 50 ml. of a mixture of ethanol and water (1:1 by volume) were refluxed for 3 hours. The clear solution obtained was then neutralized with 1.0 ml. of normal hydrochloric acid and concentrated in vacuo to dryness. The residue was dissolved in water and extracted with chloroform. The evaporated, the colourless syrupy residue was chromatographed upon silica gel and eluted with a mixture of chloroform and ethanol (9:1 by volume). 1-(2'-methyl-3' - oxobutyl - 3,7 - dimethylxanthine was obtained as a pure main fraction in about 75% yield in the form of a colourless syrup; it formed a 2,4-dinitrophenylhydrazone of melting point 203–205° C.

EXAMPLE 8

(A) Example 1A was repeated with the following modification to the second stage: A mixture of 66 g. of 2-methyl-3-carbethoxy-5,6-dihydropyrane and 150 ml. of 48% hydrobromic acid was kept at room temperature, and much carbon dioxide was evolved. Then the reaction mixture was refluxed for 1 hour. After cooling, the reaction mixture was extracted with chloroform, and the chloroform solution was washed with a saturated solution of sodium bicarbonate and dried with sodium sulfate. The chloroform was distilled off under normal pressure and the ketone was fractionally distilled in vacuo; 49 g. (71.5% of theory) of 1-bromohexanone-5 of boiling point$_{12}$ 94–98° C., were obtained.

(B) A solution of 35.4 g. of 1-bromohexanone-5 in 200 ml. of ethanol was gradually mixed at the reflux temperature with vigorous stirring with 39.7 g of theobromine-sodium in 100 ml. of water. After 3 hours reflux the unreacted theobromine was filtered off with suction, the filtrate was evaporated to dryness, the residue was dissolved in water and the solution was extracted with chloroform. The chloroform was distilled off and 1-(5'-oxohexyl)-3,7-dimethylxanthine was obtained as residue; after recrystallisation from isopropanol, it melted at 102–103° C. (about 25% yield, calculated on the reacted theobromine).

(C) Example 1A was repeated with the following modification to the second stage: A mixture of 34 g. of 2-methyl-3-carbethoxy-5,6-dihydropyrane and 50 ml. of 38% hydrochloric acid was kept for 1 hour at room temperature; during this time much carbon dioxide was evolved. The reaction mixture was saturated at 0° C. with gaseous hydrogen chloride and kept for 3 hours at this temperature and then it was allowed to warm slowly to room temperature. After standing for 12 hours it was extracted with chloroform, and the chloroform layer was freed from acid by extraction with a saturated solution of sodium bicarbonate and dried with sodium sulfate. The chloroform was distilled off at normal pressure and the residue was fractionally distilled in vacuo. 15 g. (55% of theory) of 1-chlorohexanone-5 of boiling point$_{12}$ 83–85° C. were obtained; this compound may be reacted analogously to 1-bromohexanone-5.

EXAMPLE 9

10.7 g. of methyl-β-chloroethylketone, dissolved in 150 ml. of ethanol, and 20.2 g. of theobromine-sodium, dissolved in 100 ml. of water, were reacted according to the process of Example 8. After isolation and recrystallisation from isopropanol, 1-(3'-oxobutyl)-3,7-dimethylxanthine of melting point 144–146° C. was obtained in about 70% yield.

EXAMPLE 10

A solution of 1.0 g. of sodium in 75 ml. of anhydrous ethanol was refluxed for 4 hours with 5.4 g. of ethyl acetoacetate and 13.0 g. of 1-(4'-bromobutyl)-3,7-dimethylxanthine. After separation of the sodium bromide and subsequent distillation of the alcohol, the residue obtained was intensively stirred for 2 hours with 52 ml. of 5% sodium hydroxide. The aqueous phase was separated, acidified with 5 ml. of semi-concentrated sulfuric acid, and refluxed. After the decarboxylation was completed, the solution was made alkaline and extracted with chloroform. The chloroform solution was evaporated and the residue was recrystallized from isopropanol to yield 1-(6'-oxoheptyl)-3,7-dimethylxanthine in about 60% yield. After a further recrystallisation from water, this substance melted at 119–120° C.

EXAMPLE 11

(A) 1.4 g. of sodium, dissolved in 75 ml. of absolute ethanol, 7.8 g. of ethyl acetoacetate and 18.0 g. of 1-(3'-bromopropyl)-3,7-dimethylxanthine were reacted according to the method of Example 10, the similar isolation procedure requiring 72 ml. of 5% sodium hydroxide and 7.2 ml. of semi-concentrated sulfuric acid. The residue from evaporation of the chloroform solution was chromatographed upon silica gel and eluted with a mixture of chloroform and ethanol (9:1 by volume). The main fraction was recrystallized from isopropanol to yield 1-(5'-oxohexyl)-3,7-dimethylxanthine of melting point 102–103° C. in about 70% yield.

(B) Similarly 1.2 g. of sodium, dissolved in 100 ml. of absolute ethanol, 6.5 g. of ethyl acetoacetate and 14.4 g. of 1-(2'-bromoethyl)-3,7-dimethylxanthine were reacted; isolation required 60 ml. of 5% sodium hydroxide and 7 ml. of semi-concentrated sulfuric acid. The product was 1-(4'-oxopentyl)-3,7-dimethylxanthine of melting point 111° C.

EXAMPLE 12

25.0 g. of theobromine, 27.0 g. of 2-ethylbutenone-3, 14.0 ml. of normal sodium hydroxide and 150 ml. of a mixture of ethanol and water (1:1 by volume) were refluxed for 12 hours. The solution obtained was then neutralized and the unreacted theobromine was filtered off. The alcohol was distilled off in vacuo, and the residual aqueous solution was made alkaline, and extracted once with a little petroleum ether and then with chloroform. Evaporation of the chloroform solution yielded as residue in about 70% yield (calculated on the reacted theobromine) a colourless oil 1-(2'-ethyl-3'oxobutyl)-3,7-dimethylxanthine, which formed a 2,4-dinitrophenylhydrazone of melting point 200–205° C.

EXAMPLE 13

15.6 g. of theobromine, 100 ml. of water and 10.0 g. of β-dimethylaminoethyl-methyl-ketone were refluxed for 3 hours. Then the reaction mixture was weakly acidified with 10% hydrochloric acid and filtered from the unreacted theobromine. The filtrate was made alkaline and extracted with chloroform. The residue from evaporation of the chloroform solution was recrystallized from isopropanol to yield 1-(3'-oxobutyl)-3,7-dimethylxanthine of melting point 143–144° C. in about 40% yield (calculated on reacted theobromine).

The properties of some of the compounds according to the invention, namely 7-(6'-oxoheptyl)-1,3-dimethylxanthine (I) (Example 3), 7-(5'-oxohexyl)-1,3-dimethylxanthine (II) (Examples 1A and 2), 7-(4'-oxopentyl)-1,3-dimethylxanthine (III) (Example 1A), 7-(2'-methyl-3'-oxobutyl)-1,3-dimethylxanthine (IV) (Example 5B), 7-(2'-ethyl-3' - oxobutyl)-1,3 - dimethylxanthine (V) (Example 5A) are compared in the following table with those of the parent substance 1,3-dimethylxanthine (theophylline) (VI), with the commercial 7-($\beta,\gamma$-dihydroxypropyl)-1,3-dimethylxanthine (VII), and with the previously known 7-acetonyl-1,3-dimethylxanthine (VIII) and 7-(3'-oxobutyl) - 1,3 - dimethylxanthine (IX); moreover, the properties of 1-(5'-oxohexyl)-3,7-dimethylxanthine (X) (Examples 8 and 11A), 1-(4'-oxopentyl)-3,7-dimethylxanthine (XI) (Example 11B) and 1-(3'-oxobutyl)-3,7-dimethylxanthine (XII) (Examples 6, 9 and 13), 1-(2'-methyl-3'-oxobutyl)-3,7 - dimethylxanthine (XIII) (Example 7) and 1-(2'-ethyl-3'-oxobutyl)-3,7-dimethylxanthine (XIV) (Example 12) are compared with those of the parent substance 3,7-dimethylxanthine (theobromine) (XV), the commercial 1-(2'-hydroxypropyl)-3,7-dimethylxanthine (XVI) and the previously known 1-acetonyl-3,7-dimethylxanthine (XVII) (which has not been pharmacologically studied previously).

| | Solubility, g. substance/ 100 ml. water (room temperature) | Solubility, g. substance/ 100 g. benzene (room temperature) | Vasodilatory activity plus | $LD_{50}$ mg./kg. mouse (per os) |
|---|---|---|---|---|
| I | (¹) | 170 | 56 | 750–1,000 |
| II | (¹) | 94 | 100 | 750–1,000 |
| III | (¹) | 9 | 84 | 750–1,000 |
| IV | 1.2 | 4.4 | 85 | 1,000–1,200 |
| V | 5.9 | 27 | 98 | 1,000–1,100 |
| VI | 0.5 | 0.03 | 58 | 327 |
| VII | 18 | 0.05 | 4 | 1,954 |
| VIII | 3 | 1 | 48 | 750–1,000 |
| IX | 6 | 1 | 29 | 500–750 |
| X | 95 | 11 | 93 | 1,385 |
| XI | 38 | 7 | 53 | >1,400 |
| XII | 16 | 2 | 45 | About 1,500 |
| XIII | 120 | 45 | 95 | 500–750 |
| XIV | 8 | >170 | 75 | 500–750 |
| XV | 0.03 | 0.009 | 26 | 1,500 |
| XVI | 92 | 0.3 | 11 | 1,066 |
| XVII | 3.6 | 1 | 48 | 905 |

¹ About 400.

The vaso-dilatory activity was determined according to Krawkow-Pissemski on an isolated rabbit ear, with Ringer's solution at a concentration of 0.1 mg. substance/ml. 1-(m-hydroxyphenyl) - 2 - aminoethanol hydrochloride (0.5γ/ml.) was added to the nutrient solution to improve vasotonia.

It is evident from the table that the compounds according to the invention have good solubility in lipids and also surprisingly a very good solubility in water, as distinct from the hitherto known derivatives of 1,3- or 3,7-dimethylxanthine. A surprising further pharmaceutical application of those oxoalkyldimethylxanthines of the invention which are freely soluble in water, e.g. at least 4%, is that these derivatives considerably improve the water solubility of other therapeutically useful substances. Thus various therapeutically effective substances cannot be administered to human beings or animals parenterally, i.e. by injection, although such parenteral use would have therapeutic advantages over oral or rectal use, since aqueous solutions of a concentration necessary for injection cannot be obtained owing to the sparing solubility of such substances in water. Various attempts have already been made to dissolve such substances by suitable solubilisers. For example, modified polyoxythylenes, so called "Tweens," have been used; these compounds, however, are not pharmacologically inert and therefore cause undesired side-effects. It is also known that theophylline (a compound frequently used therapeutically which is not suitable for injection as it is too insoluble in water in the forms both of its base and of various moderately water-soluble addition-compounds) may be dissolved in water by means of ethylene diamine, which acts as a solubiliser, the resulting more concentrated solutions being suitable for injection and often used.

The discovery that the compounds of the invention are solubilisers for various therapeutically useful substances is therefore an important advance. Thus it is possible to produce for example a 1.4% aqueous solution of khelline (which compound is soluble only to the extent of 20 mg. per 100 ml. of water at room temperature) in a 10% aqueous solution of 1-oxohexyl-3,7-dimethylxanthine. The solubility of caffeine may be improved by more than tenfold by the addition of 1-oxohexyl-3,7-dimethylxanthine. This solubilising effect is not only limited to these substances, but surprisingly also applies to alkaloids, e.g. yohimbine, corynanthine and derivatives thereof, and various other substances, e.g. nicotinic acid esters, as is evident from the following table.

SOLUBILITY OF VARIOUS THERAPEUTICALLY ACTIVE SUBSTANCES IN WATER AND IN AQUEOUS SOLUTIONS OF THE AFORE-SAID COMPOUNDS I, II, X AND XII

| Substance | Solubility, g. substance/100 ml. water at room temperature | Solution of I (10%) | Solution of II (10%) | Solution of X (10%) | Solution of X (30%) | Solution of XII (10%) |
|---|---|---|---|---|---|---|
| Pentaerythritol-tetranicotinate | (¹) | | | 0.1 | 1.0 | |
| Rutine | 0.01 | | | | 0.6 | |
| Reserpine-hydrochloride | 0.01 | | | | 0.3 | |
| Khelline | 0.02 | 1.3 | 1.3 | 1.4 | 4.5 | 1.4 |
| Theobromine | 0.03 | | | | 0.2 | |
| Glycerol-trinicotinate | 0.03 | 1.0 | 1.0 | 1.0 | 6.6 | 1.0 |
| 5-phenyl-5-(3'-oxobutyl-) barbituric acid | 0.04 | | | | 1.3 | |
| 1-hexyl-3,7-dimethylxanthine | 0.08 | | 0.3 | 0.3 | 0.7 | |
| Ergotamin-tartrate | 0.1 | | | >2.5 | >5 | |
| O-phenacetyl-N-acetyl-corynanthine-hydrochloride | 0.1 | | 1.9 | 1.7 | 8.0 | |
| Theophylline | 0.5 | 1.6 | 1.8 | 2.1 | 4.0 | 2.4 |
| Yohimbine-hydrochloride | 0.8 | | 2.5 | 2.5 | 4.0 | |
| Caffeine | 1.5 | | 8.0 | 8.0 | 15.6 | |

¹ Insoluble.

What we claim is:
1. A process for the preparation of a (5'-oxohexyl)-dimethylxanthine by reacting a 1,3-dihalopropane which has a halogen atomic weight of at least 35 with ethyl acetoacetate in the presence of alcohol of at least 90% concentration and in the presence of at least 2 mols of potassium carbonate at a temperature in the range from 60 to 110° C. to yield 2-methyl-3-carbethoxy-dihydropyrane, and further reacting this compound with two mols of a hydrogen halide to form the 1-halohexanone derivative and then reacting said halohexanone derivative with an alkali metal salt selected from the group consisting of theobromine or theophylline.

2. A process as claimed in claim 1 wherein the halogen component of the 1,3-dihalopropane and of the hydrogen halide is chlorine or bromine and wherein the alcohol used is of about 96% concentration.

3. A process as claimed in claim 2 wherein the 2-methyl-3-carbethoxy-dihydropyrane is reacted with at least 2 mols of hydrogen bromide in the form of an at least 60% aqueous solution at a temperature in the range from 0° C. to 30° C. to yield 1-bromo-hexanone-5.

References Cited

UNITED STATES PATENTS

| 2,776,300 | 1/1957 | Jenkins | 260—345.8 |
| 2,815,379 | 12/1957 | Surmatis | 260—595 |
| 3,030,363 | 4/1962 | Konz et al. | 260—256 |
| 3,122,587 | 2/1962 | Stansbury et al. | 260—293 |
| 3,029,239 | 4/1962 | Kohlstaedt et al. | 260—256 |

FOREIGN PATENTS

| 216,011 | 7/1961 | Austria. |
| 759,981 | 10/1956 | Great Britain. |

OTHER REFERENCES

Polonovski et al., Compt. Rend., vol. 240, 1955, pp. 2079–2080, Q46–A14.

NICHOLAS S. RIZZO, *Primary Examiner.*

R. GALLAGHER, *Assistant Examiner.*

U.S. Cl. X.R.

260—254, 345.8, 253; 424—253, 358